Feb. 24, 1959  R. F. DEHN  2,874,816
ADJUSTABLE CLUTCH FOR METAL FORMING MACHINES
Filed Dec. 20, 1954  3 Sheets-Sheet 1

INVENTOR.
Roy F. Dehn
BY Hudson, Boughton,
Williams, David & Hoffmann
ATTORNEYS

Feb. 24, 1959  R. F. DEHN  2,874,816
ADJUSTABLE CLUTCH FOR METAL FORMING MACHINES
Filed Dec. 20, 1954  3 Sheets-Sheet 2

INVENTOR.
ROY F. DEHN
BY Hudson, Boughton,
Williams, David & Hoffmann
ATTORNEYS

INVENTOR.
ROY F. DEHN

United States Patent Office 2,874,816
Patented Feb. 24, 1959

2,874,816

ADJUSTABLE CLUTCH FOR METAL FORMING MACHINES

Roy F. Dehn, Wickliffe, Ohio, assignor to The Cleveland Crane & Engineering Company, Wickliffe, Ohio, a corporation of Ohio Application December 20, 1954, Serial No. 476,411

2 Claims. (Cl. 192—111)

The present invention relates to power operated metal forming machines and, more particularly, to power operated metal forming machines having a clutch engageable to intermittently move a member thereof.

An important object of the present invention is the provision of novel and improved power operated metal forming machines, such as bending brakes or the like, having a member to be intermittently moved and clutch means for connecting the member in driving relationship with suitable power actuated means, the clutch means being so constructed and arranged that the operator can readily judge and control the power being transmitted by the clutch.

Another object of the present invention is the provision of new and improved power operated metal forming machines, such as bending brakes or the like, having a ram member to be moved by a flywheel rotatably supported on a shaft and adapted to be connected with the shaft by a clutch mechanism connected to one side of the flywheel and coaxial about the shaft, the clutch mechanism being spring-released and operator-actuated to its engaged position whereby the force tending to urge the clutch plates to their engaged position is a function of the force applied to the actuating mechanism by the operator.

Another object of the present invention is the provision of new and improved power operated metal forming machines, such as bending brakes or the like, having a low inertia clutch for connecting a flywheel to a shaft for moving a ram member or the like, the clutch being so constructed and arranged that the proper positioning of its actuating parts may be effected by making a single adjustment.

Still another object of the present invention is the provision of new and improved power operated metal forming machines, such as bending brakes or the like, having a spring-biased clutch mechanism for interconnecting a flywheel and a shaft rotatably supporting the flywheel, the clutch mechanism being so constructed and arranged that a clutch plate movable to engage and disengage the clutch and its actuating mechanism, including the clutch biasing springs, may be assembled or removed from the clutch mechanism as a unit with the parts in operative relationship, the clutch biasing springs tending to move the individual parts of the unit toward each other.

Yet another object of the present invention is the provision of new and improved power operated metal forming machines, such as bending brakes or like machines, having a low inertia clutch for connecting a flywheel to a shaft for reciprocating a ram member or the like, the clutch being so constructed and arranged that it may be adjusted by the rotation of a ring carried by the clutch housing.

Another object of the present invention is the provision of new and improved power operated metal forming machines, such as bending brakes or like machines, having a clutch mechanism for intermittently connecting a flywheel to a shaft, the clutch mechanism comprising a circular plate-like member threaded into an internally threaded ring supporting the member for movement along the shaft to which the flywheel is connected to effect adjustment of the clutch, the member carrying detent means to prevent relative movement between the ring and the member but operable to permit adjustment of the member and also the removal thereof upon movement of the ring to a predetermined position with respect to the member.

A more specific object of the present invention is the provision of a new and improved low inertia, dependable, easily adjusted clutch mechanism for connecting the flywheel and drive shaft of power operated metal forming machines, such as bending brakes or the like, comprising driving and driven clutch plates and an adjustable member carrying a clutch actuating plate, lever means for controlling the engagement and disengagement of the clutch plates, and means for actuating the lever means, the adjustment of the member effecting adjustment of the movable clutch plate while maintaining the proper relationship between the parts for moving the clutch actuating plate.

The invention resides in certain constructions and combinations and arrangements of parts, and further objects and advantages will be apparent to those skilled in the art to which it relates from the following description of the preferred embodiment described with reference to the accompanying drawings forming a part of this specification, in which.

Figure 1:
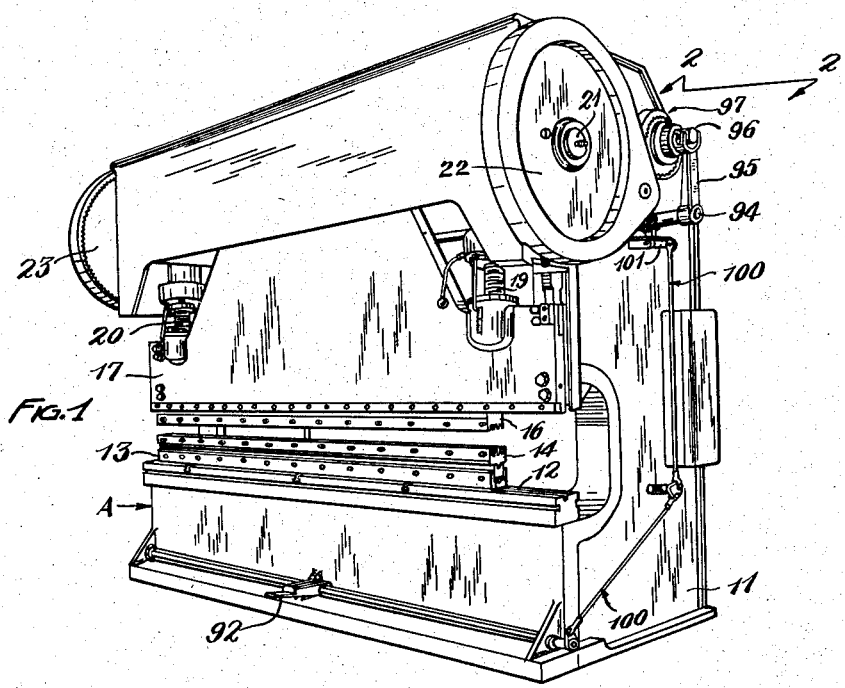
Fig. 1 is a front elevational view of a bending brake embodying the invention.

Although the present invention is susceptible of various modifications and of use with various machines such as bending brakes, presses or the like, having intermittently reciprocable or oscillatable leaves, rams or punches, it is particularly suitable for use in bending brakes and other machines where it is desirable that the operator be able to judge and control the amount of power being transmitted by the clutch.

For purposes of illustration, the invention has been embodied in a bending brake where, as mentioned above, it is particularly useful. Referring to the drawings the bending brake generally comprises a frame A having end plates 11, only one of which appears in the drawings, and a front plate or lower leaf 12 which carries a lower die plate 13. The upper surface of the die plate 13 forms the supporting surface or abutment for a lower die or punch 14 as the case may be. An upper die or punch 16 is connected to the lower end of an upper leaf member or ram 17 slidably supported above the die plate 13 and adapted to be reciprocated toward and from the die plate 13 by pitmans 19, 20 pivotally connected to the ram and to the cranks of a crankshaft 21 journalled in the crown or upper portions of the frame A.

Figure 4:
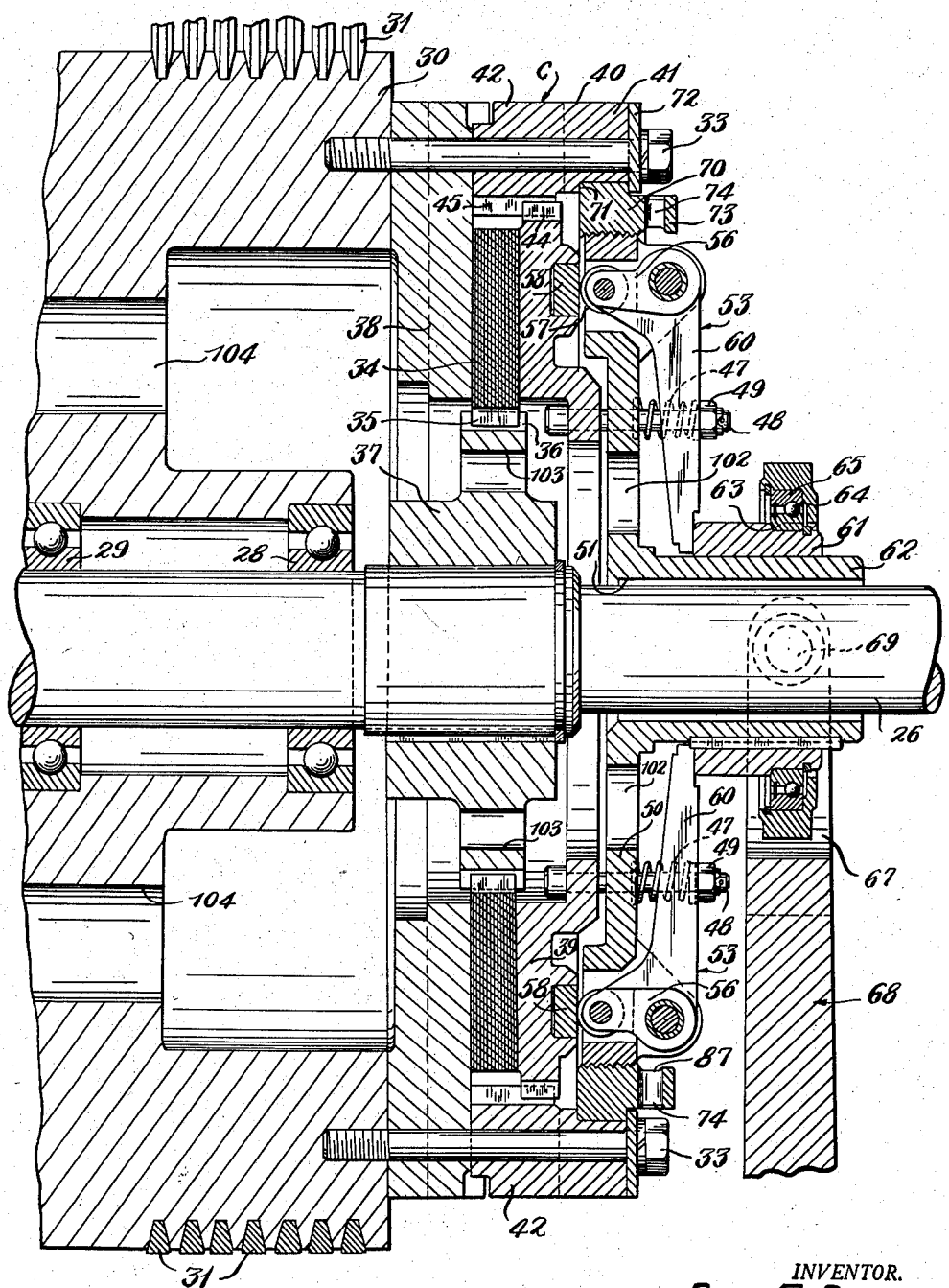
Fig. 4 is a view taken substantially along line 4—4 of Fig. 3.

The crankshaft 21 is driven by two bull gears 22, 23 which are attached to the opposite ends thereof. The bull gears 22, 23 are driven by drive pinions, not shown, in the drawings, fixed to a drive shaft 26 rotatably supported by the frame A parallel to the crankshaft 21. The drive shaft 26 carries a flywheel 30 rotatably supported thereon, preferably by spaced antifriction bearings 28, 29, as shown in Fig. 4 so that the flywheel freely rotates on the shaft. The flywheel is driven through drive belts 31 by an electric motor, not shown, supported on the upper part of the frame. The bearings for the flywheel are spaced so as to be capable of supporting the entire weight of the flywheel while maintaining the flywheel in operative position on shaft 26.

The flywheel is adapted to be intermittently connected in driving relation with the shaft 26 by a clutch mechanism indicated generally by the reference character C and detachably connected to the flywheel by bolts 33. The clutch mechanism comprises a driven clutch element, plate, or disk 34 having spline teeth 35 about the periphery of a central opening therethrough adapted to cooperate with spline teeth 36 about the outer periphery of a hub 37 keyed to the shaft 26. The spline connection between the driven disk 34 and the shaft 26 allows the disk to move axially of the shaft.

The driven disk 34 is adapted to be clamped against a clutch plate 38, connected to one side of the flywheel 30, by a clutch actuating plate 39. The clutch actuating plate 39 is supported for axial movement with respect to the drive shaft 26 by an annular member 40 within which the clutch actuating plate 39 is positioned. The annular member 40 is connected to the flywheel by bolts 33 and comprises a ring-like portion 41 and a plurality of spaced projections 42 extending from the ring-like portion 41 into engagement with the clutch plate 38. The spaces between the projections 42 provide openings 43 for the passage of cooling air. The clutch actuating plate 39 has spline teeth 44 about its periphery which are adapted to cooperate with spline teeth 45 on the inner side of the projections 42 so as to permit movement of the plate axially of the shaft 26 to clutch-engaged and clutch-disengaged positions.

The clutch actuating plate 39 is spring-biased to its clutch-disengaged position, i. e., to the right as viewed in Fig. 4, by a plurality of springs 47. Each spring 47 is operatively connected to the clutch actuating plate 39 by a bolt 48 passing through the clutch actuating plate 39 and extending outwardly therefrom. The springs 47 are interposed between a nut 49 on the outer end of each bolt and a circular plate or cover member 50 positioned within the annular member 40 adjacent the right-hand end of the opening therethrough, as viewed in Fig. 4. The circular plate 50 has a central opening 51 therethrough for permitting the passage of the drive shaft 26, preferably with clearance between the shaft 26 and the sides of the opening 51. Clearance between the shaft and the sides of the opening 51 will facilitate the flow of cooling air through the clutch.

The clutch actuating plate 39 is adapted to be moved to its clutch-engaged position by the operation of a plurality of bell crank levers 53 carried by the outer side of the circular plate 50. The bell crank levers 53 are each pivotally secured between spaced ears 54 projecting outwardly from the outer side of the circular plate 50 by a pivot pin 55 extending through the ears 54 and the levers 53. The bell crank levers 53 each have an arm 56 that projects through one of a plurality of axially extending openings in the circular plate 50 and mounts a roller 57 at its outer end. The rollers 57 are adapted to engage hardened inserts 58 carried by the clutch actuating plate 39. The levers 53 also have an arm 60 extending from the pivot pin 55 radially toward the drive shaft 26. Movement of the arm 60 of the levers 53 toward the flywheel 30 will cause the arm 56 to move the clutch actuating plate 39 toward its clutch-engaged position.

The levers 53 are adapted to be operated by a collar 61 slidably supported upon a sleeve 62 extending outwardly about the shaft 26 from the shaft opening 51. In the illustrated embodiment the sleeve 62 is integral with the circular plate 50. The collar 61 supports the inner race 63 of a ball bearing 64 having its outer race 65 connected between the spaced arms 67 of a yoke member 68 by trunnions 69 which are received in slots in the arms 67. The clutch may be actuated to its engaged position by movement of the yoke member 68 to the left as the clutch is viewed in Fig. 4.

The circular plate 50 is movable axially of shaft 26 to effect adjustment of the clutch actuating plate 39. To this end, plate 50 is threaded into an internally threaded ring 70 supported for rotational movement within the annular member 40 adjacent the right-hand end of the opening therethrough as viewed in Fig. 4. The ring 70 is held against axial movement by an internal shoulder 71 formed as part of the annular member 40 and by a collar 72 fastened to the outer end of the annular member 40 and overlying the ring 70. The ring 70 is secured to the member 40 by bolts 33. Rotation of the ring 70 threads the cover plate 50 toward or away from the flywheel 30. The clutch actuating plate 39 will be carried with the plate 50 because of its connection thereto by the bolt 48 and springs 47 unless prohibited from doing so by engagement with the disk 34. The ring 70 has a circular flange 73 extending outwardly therefrom, the flange having a plurality of spaced, radially extending openings 74 therethrough adapted to receive a bar for rotating the ring.

The circular plate 50 carries a detent mechanism for preventing relative rotation between the ring 70 and the plate 50 after the plate is properly positioned. The detent mechanism comprises a plunger 76 supported in a radially extending bore 77 in boss 78 on the outer side of the plate 50. The plunger has a cylindrical detent finger 80 offset from the axis of the plunger projecting from the upper end thereof and outwardly of the bore 77, the outer end portion 81 of the finger being reduced in diameter, thereby forming a shoulder 82 intermediate the ends of the finger. The plunger 76 is spring-biased outwardly by a spring 83 positioned within an axial bore 84 in the plunger 76 and engaging the bottom of the bore 77 in the boss 78.

To prevent relative rotation of the ring 70 and the plate 50, the reduced portion 81 of the finger 80 is adapted to be received by one of the plurality of radially extending openings 74 in the circular flange 73 carried by the ring 70. The movement of the portion 81 into any one of the openings 74 is limited by the engagement of the shoulder 82 with the underside of flange 73. The underside of the flange 73 has a peripherally extending groove 87 in which the reduced portion 81 is adapted to ride when pushed from openings 73 during the adjustment of the circular plate 50 by a bar inserted in the opening to rotate the ring 70.

The plunger 76 is dimensioned with respect to the bore 77 so that it may be depressed far enough to enable the reduced portion 81 to clear the side walls of groove 87. A projection 90, however, depending from the underside of the plunger 76 will normally engage the bottom of the bore 77 and allow the plunger to be depressed only sufficiently to remove the reduced portion 81 from the openings 74 and permit it to ride the groove 87. If it is desired to depress the plunger sufficiently to move the reduced portion 81 clear of the side walls of groove 78 to permit disassembly of the ring 70 and the plate 50, the plunger is rotated to align the projection 90 with a bore 91 opening into the bottom of bore 77. Since the axis of the detent finger 80 is offset from the axis of the plunger 76, the plunger will rotate as the ring 70 and plate 50 are moved axially with respect to each other to maintain a fixed axial position with respect to the ring 70. It may now be seen that the bore 91 may be so positioned that the projection 90 will register therewith to permit disassembly of the ring 70 and plate 50 by rotating the ring 70 until the plate 50 is moved to a particular position where the plunger 76 has been rotated sufficiently to align the projection 90 and the bore 91.

In operation, the clutch is moved to its engaged position upon the depression by an operator of a pedal 92 at the front of the bending brake. The pedal 92 is operatively connected to the clutch mechanism C by means comprising an actuating rod 94 connected to the lower end of the yoke member 68 and slidably supported in the end plate 11 and extending from the outer side thereof, the outer end of the rod 94 being connected to an upwardly rising yoke member 95.

The yoke member 95 is connected to an actuating member 96 for a brake 97 on the outer end of drive shaft 26. The brake 97 may be of any conventional construction and, therefore, the details thereof will not be shown or described. Suffice it to say that the brake may be of the same construction as the clutch mechanism and is actuated to its released position by movement of the brake actuating member 96 to the left, as it is viewed in Fig. 2. The rod 94 is spring biased to a brake engaged, clutch released position by a spring 98 coiled thereabout and interposed between the inner side of end plate 11 and a collar 99 on the rod. The rod 94 is moved to the left to engage the clutch and release the brake by a linkage 100 connected to the pedal 92 and adapted to operate a rocker member 101 engaging a roller on rod 94.

Figure 2:
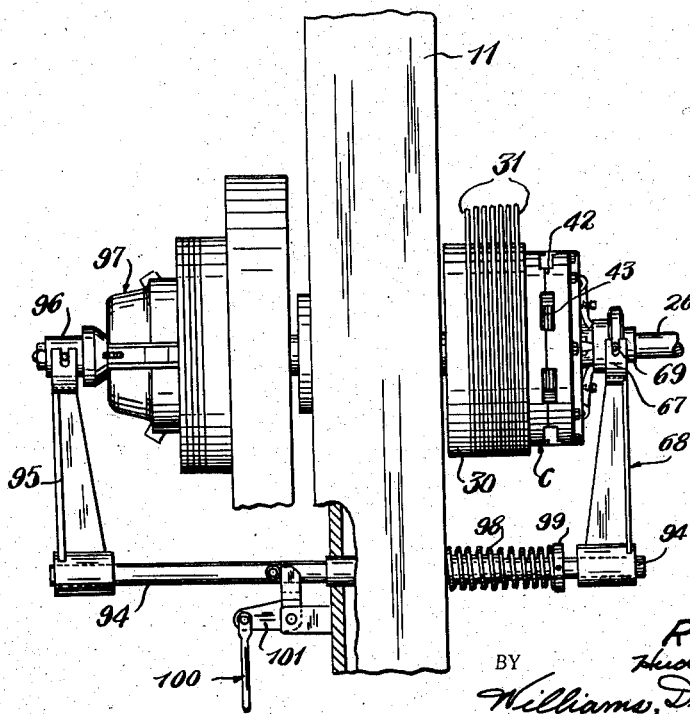
Fig. 2 is a fragmentary elevational view approximately along line 2—2 of Fig. 1 showing the clutch and brake for the drive shaft of the bending brake.
Figure 3:
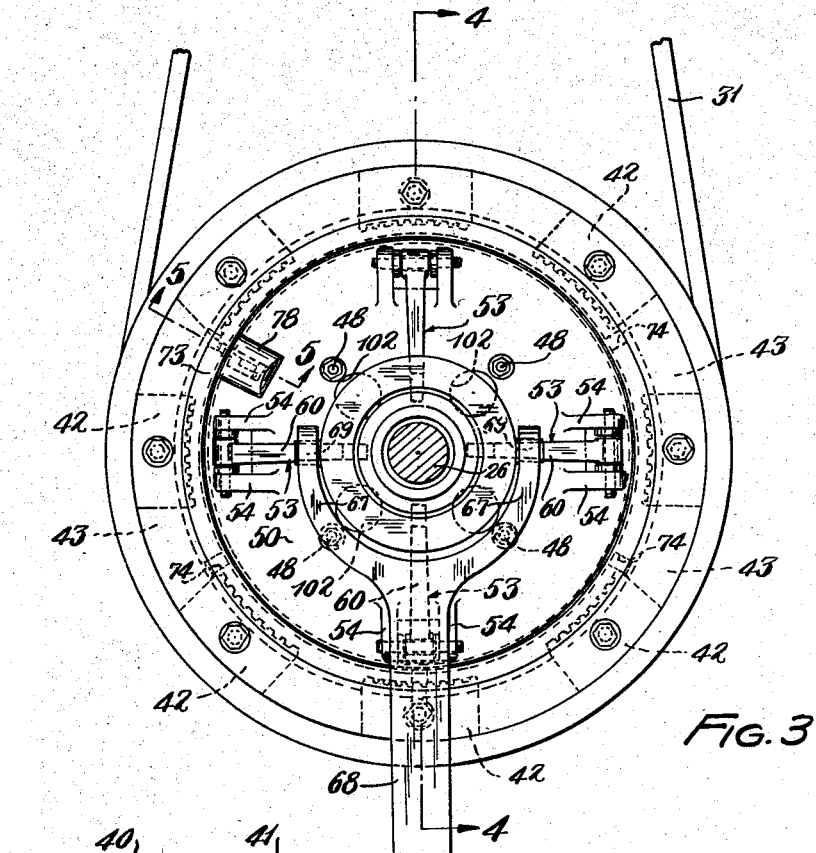
Fig. 3 is an end elevational view of the clutch mechanism of Fig. 2.
Figure 5:
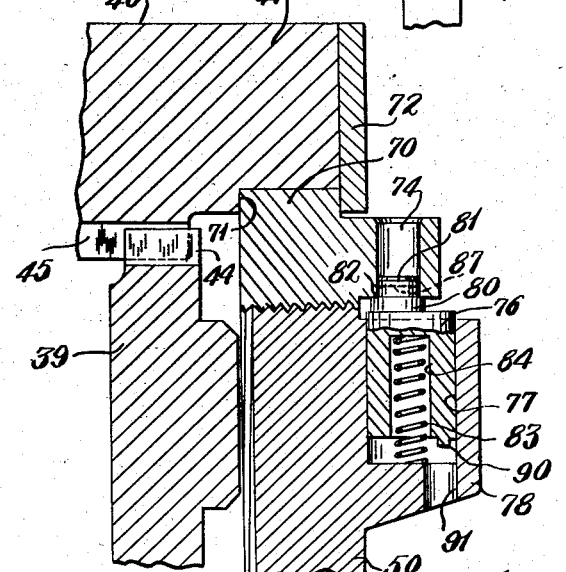
Fig. 5 is an enlarged fragmentary sectional view taken substantially along line 5—5 of Fig. 3.

When the pedal 92 is depressed, the linkage 100 functions to move the rod 94 to the left as it is viewed in Fig. 2. When the foot of the operator is removed from the pedal 92, the clutch is automatically released due to the action of the clutch springs 47 and the spring 98, which causes the actuating rod 94 to move to the right, as viewed in Fig. 2. Movement of the rod 94 to the right upon release of the pedal 92 causes the brake 97 to be applied to immediately stop the rotation of shaft 26.

The operation engages the clutch against the action of the springs 47 and spring 98 and is given, through the feel of the pedal, an indication as to the amount of power which is being transmitted by the clutch. The force urging the clutch plates into engagement is directly dependent upon the force applied to the pedal 92 by the operator thereby giving the operator fine control of the power transmitted by the clutch. This type of clutch may be termed an operator-powered or operator-actuated clutch.

The circular plate 50 is provided with a plurality of spaced openings 102 to permit air flow through the cover for cooling the clutch mechanism. The ears 54 for supporting the levers 53 act as blower vanes to impart movement to the cooling air. The cooling air travels through the openings 102 and through axial openings 103 in the radial projection of the hub 37 to cool the clutch elements, and through the flywheel 30 by means of passages 104 in the flywheel which are parallel to the shaft 26.

From the foregoing it will be apparent that the present invention provides a new and improved bending brake or like machine having a clutch mechanism which is readily adjustable. The clutch mechanism is also so constructed and arranged that the movable clutch plate and the support member for the lever means for actuating the clutch plate may be assembled as a unit which is held together in a compact manner by the clutch biasing springs which tend to urge the plate 50 and the plate 39 toward each other. When the clutch is assembled, it may be readily adjusted by rotation of the ring 70 to move the clutch actuating plate and the support member for the levers for actuating the plate against the clutch biasing springs axially along the shaft to which the clutch is adapted to be connected. Detent means is also provided to prevent relative rotation between the adjusting ring and the plate or member for supporting the clutch actuating levers which is rotated to a position where it will always be in position to register with an opening in the adjusting ring to prevent relative rotation between the ring and the support plate or member for the clutch actuating levers even though the ring and supporting member are moved axially with respect to each other.

While the preferred illustrated embodiment of the present invention shows a particular arrangement of the clutch plates, it is to be understood that other arrangements can be utilized such as a single driving plate and a single driven plate with either the driving or driven plate fixed and the other moved into engagement therewith.

It can be seen from the foregoing that I have provided a bending brake or like machine having a light weight dependable low inertia, easily adjusted, non-spring set, clutch mechanism for connecting a shaft and a flywheel journalled thereon in driving relationship. The clutch is also so constructed and arranged that adjustment of the means for engaging and disengaging the clutch elements may be effected by the adjustment of a single member.

The preferred form of the invention has been described in considerable detail, however, it will be apparent that the invention is not limited to the construction shown and it is my intention to cover hereby all adaptations, modifications and changes therein which come within the practice of those skilled in the art to which the invention relates and the scope of the appended claims.

Having thus described my invention, I claim:

1. A clutch mechanism for connecting a power driven element to a shaft to be rotated comprising an annular housing, driving and driven clutch plates within said housing and relatively movable to engaged and disengaged positions, lever means for actuating said clutch plates to at least one of said positions, a plate-like member for supporting said lever means, an internally threaded ring member rotatably supported by said housing, said plate-like member being threaded into said ring member and movable axially of said housing by the rotation of said ring member, and means for preventing relative rotation between said members comprising a detent finger supported by one of said members and adapted to be received by an opening in the other of said members, and means supporting said detent finger for rotation about an axis offset from the axis of the finger whereby the relative axial position of said finger with respect to said other member may be maintained upon relative axial movement between said members, and means for yieldably urging said detent finger toward said other member.

2. A clutch mechanism for connecting a power driven element to a shaft to be rotated comprising an annular housing, driving and driven clutch plates within said housing and relatively movable to engaged and disengaged positions, lever means for actuating said clutch plates to at least one of said positions, a plate-like member for supporting said lever means, an internally threaded ring member rotatively and coaxially supported by said housing, said plate-like member being threaded into said ring member and movable axially of said housing by rotation of said ring member, and means for preventing relative rotation of said members comprising a detent finger carried by said plate-like member, said ring member having a plurality of radially extending openings adapted to receive said finger and a groove interconnecting said openings, said detent finger being adapted to ride in said groove upon relative rotation between said members, means supporting said finger on said plate-like member for rotation about an axis offset from the axis of said finger, and means for yieldably urging said finger toward said ring including means permitting said finger to be axially moved to a position clear of said groove upon the positioning of said detent finger in a particular manner with respect to its supporting means.

References Cited in the file of this patent
UNITED STATES PATENTS

| | | |
|---|---|---|
| 483,892 | Borchers | Oct. 4, 1892 |
| 903,945 | Ast | Nov. 17, 1908 |
| 984,209 | Gilson | Feb. 14, 1911 |
| 1,131,769 | Borg | Mar. 16, 1915 |
| 1,306,230 | Ollard | June 10, 1919 |
| 2,095,816 | Johansen | Oct. 12, 1937 |
| 2,167,450 | Ginsburg | July 25, 1939 |
| 2,180,403 | Dunkelow | Nov. 21, 1939 |
| 2,280,356 | Spase et al | Apr. 21, 1942 |
| 2,362,343 | Bath | Nov. 7, 1944 |
| 2,436,817 | Miller | Mar. 2, 1948 |